(12) United States Patent
Couturier et al.

(10) Patent No.: US 7,620,989 B1
(45) Date of Patent: Nov. 17, 2009

(54) NETWORK TESTING METHODS AND SYSTEMS

(75) Inventors: Russell L. Couturier, Worcester, MA (US); Dinkar Chivaluri, Burlington, MA (US)

(73) Assignee: Spirent Communications Inc., Sunnyvale, CA (US)

( * ) Notice: Subject to any disclaimer, the term of this patent is extended or adjusted under 35 U.S.C. 154(b) by 836 days.

(21) Appl. No.: 11/061,102

(22) Filed: Feb. 18, 2005

Related U.S. Application Data (60) Provisional application No. 60/545,864, filed on Feb. 19, 2004.

(51) Int. Cl.
  *G06F 21/00* (2006.01)
(52) U.S. Cl. .............................. 726/23; 726/22; 726/24; 726/25
(58) Field of Classification Search .................. 726/22, 726/23, 24, 25
  See application file for complete search history.

(56) References Cited

U.S. PATENT DOCUMENTS

| | | | |
|---|---|---|---|
| 6,453,345 B2 * | 9/2002 | Trcka et al. ................. | 709/224 |
| 6,952,779 B1 * | 10/2005 | Cohen et al. ................. | 726/22 |
| 7,032,031 B2 * | 4/2006 | Jungck et al. ............... | 709/246 |
| 7,076,393 B2 * | 7/2006 | Ormazabal et al. .......... | 702/122 |
| 7,185,232 B1 * | 2/2007 | Leavy et al. .................. | 714/41 |
| 7,194,535 B2 * | 3/2007 | Hannel et al. ................ | 709/224 |
| 7,325,252 B2 * | 1/2008 | Bunker et al. ................. | 726/25 |
| 2003/0051026 A1 * | 3/2003 | Carter et al. ................. | 709/224 |
| 2003/0208616 A1 * | 11/2003 | Laing et al. .................. | 709/236 |
| 2004/0117478 A1 * | 6/2004 | Triulzi et al. ................. | 709/224 |
| 2004/0250124 A1 * | 12/2004 | Chesla et al. ................ | 713/201 |
| 2006/0137009 A1 * | 6/2006 | Chesla ......................... | 726/22 |
| 2007/0025261 A1 * | 2/2007 | Ginsberg et al. ............. | 370/250 |

OTHER PUBLICATIONS

Sung-Do Chi, Jong Sou Park, Ki-Chan Jung, and Jang-Se Lee; "Network Security Modeling and Cyber Attack Simulation Methodology"; Department of Computer Engineering Hangkong University, Seoul, Korea; Springer-Verlag Berlin Heidelberg, Jan. 1, 2001; pp. 320-333.*

* cited by examiner

*Primary Examiner*—Carl Colin
(74) *Attorney, Agent, or Firm*—Jacobs & Kim LLP; David Jacobs (57) ABSTRACT

Network vulnerability testing methods, systems, devices, appliances and software products generate stateful and stateless network representative of network threats. The traffic is applied to a network or device under test, thereby to test the vulnerability of the network or device to threats. A graphical user interface, which does not require a programming or scripting language can be used to generate an intermediate descriptive format that can in turn be used to generate stateful or stateless threat signatures. By using the intermediate descriptive form, threats can be generated under the control of the graphical user interface and in accordance with stored threat signatures, without the need for a programming or scripting language.

12 Claims, 6 Drawing Sheets

FIG. 1

PRIOR ART

NETWORK TESTING METHODS AND SYSTEMS

CROSS-REFERENCE TO RELATED PATENT APPLICATION

This application for patent is related to and claims the priority of commonly owned Provisional Application for U.S. Patent Ser. No. 60/545,864, filed Feb. 19, 2004, entitled "Network Testing Methods and Systems", which is incorporated by reference herein in its entirety.

FIELD OF THE INVENTION

The present invention relates to the field of network testing, and in particular, to methods, systems, devices, appliances and software for generating and applying threats against networks in order to test such networks.

BACKGROUND OF THE INVENTION

The Internet is the primary vehicle for moving sensitive electronic information. Credit card purchases, financial exchanges, bank interaction, credit checking/reporting, health and insurance records, and an enormous volume of other privileged information is constantly being exchanged. (By way of example, FIG. 1A (Prior Art) attached hereto is a schematic diagram showing generally the data flows between and among digital processors configured as servers or hosts (S1, S2, S3) and as clients (C1, C2, C3) via the Internet or other networks, using known communications and networking techniques.) Not surprisingly, such data, traveling from host to host, host to client, or client to host over public networks and equipment, have become a primary target for electronic theft and disruption, typically attempted or accomplished through a process commonly known as "hacking".

Hacking techniques frequently take the form of denial of services (DOS), resource exhaustion, port scanning, and/or port corruption.

In a denial of services attack, large amounts of valid traffic are generated with the intent of overwhelming the capacity of a network or specific network equipment. An example of this would be sending thousands of ARP requests to a router.

In a resource exhaustion attack, similarly, the attack takes up the resources of the host, server or device under attack, including memory, buffers, registers and the like, until all resources are consumed, and the network connection is never released.

A port scanning attack involves the use of phantom hosts that scan the ports of another host seeking access to applications and data.

Port corruption creates invalid traffic that causes the computer equipment to fail and potentially opening up access to applications and data.

Hacking techniques may take some or multiple forms of all of these types of attacks.

In an effort to combat such attacks, network equipment manufacturers (NEMs) are spending a large percentage, in many cases the majority, of their R&D budgets today implementing intrusion detection systems (IDS). These applications seek to detect, isolate, and limit potential threats introduced by hackers. Accordingly, such applications should have the ability to isolate a single threat from among the thousands of legitimate users and applications in real-time. However, intrusion threats can take a variety of forms, are becoming more sophisticated, and new threats are being discovered on a daily basis. As a result, IDS systems are always "behind the curve". They can only detect threats that are known, and more particularly, those that have been identified, analyzed and reverse engineered. This means networks everywhere are exposed, vulnerable and subject to a new attack at any moment. Threats are only discovered after the fact, and remedies are developed only after the damage has occurred. The NEMs must use in-house development staffs to manually replicate the threat, developing applications using C, C++, and similar languages. This is a process that can require weeks to complete; first, to research the threat, then to develop the application, and finally to deploy testing throughout the quality assurance effort. This process must be repeated for every threat, by every manufacturer.

NEMs, telecommunication companies, and large scale network providers would benefit from a tool that provides proactive threat analysis while staying current with the latest hacking techniques. A tool of this type should have a number of high level goals, including the following.

It would be desirable to provide network threat testing methods, systems, devices, appliances and software that can replicate real hacking techniques.

In particular, it would be desirable to provide network threat testing methods, systems, devices, appliances and software that can apply real hacking techniques against network equipment, hosts, and networking infrastructures.

It would also be desirable to provide network threat testing methods, systems, devices, appliances and software that can create a hacking technique without requiring programmatic coding.

Still further, it would be desirable to provide network threat testing methods, systems, devices, appliances and software that can easily replicate a hacking threat within minutes of its discovery (instead of days or weeks).

It would also be desirable to provide network threat testing methods, systems, devices, appliances and software for maintaining an online database of hacking techniques that can be queried in real time.

In addition, it would be desirable to be able to quickly and efficiently distribute these hacking threats to quality assurance organizations.

SUMMARY OF THE INVENTION

The invention provides these advantages, providing methods, systems, devices, appliances and software which enable replications of real hacking techniques and the application of such techniques, without the necessity of programmatic coding, against networks and network equipment, thereby allowing efficient testing of such networks and equipment. The invention also allows the creating of new hacking techniques and threat signatures (described in greater detail below) without requiring programmatic coding, by utilizing an intermediate representational form and a graphical user interface (GUI). A further aspect of the invention is the maintaining of an online database of hacking techniques that can be queried in real time, and from which hacking threats can be quickly and efficiently distributed to quality assurance organizations.

As described below, one aspect of the invention involves generating both stateful and stateless networking traffic, the stateful and stateless network traffic collectively representing threats to the network, and applying the stateful and stateless network traffic to the network, thereby to test the network. The generated traffic can represent network threats including denial of service, resource exhaustion, port scanning, or port corruption. The generating aspect can be effected without the use of a programming or scripting language, and traffic can be represented using a descriptive format.

In another aspect of the invention, a GUI (without the use of a programmatic or scripting language) is operable to generate an intermediate descriptive format that in turn can be used to generate threat signatures.

The techniques described herein can be used to modify or corrupt any stateful or stateless traffic streams. In a particular example of the invention, traffic streams are modified using Network Address Translation (NAT) techniques.

A further aspect of the invention involves storing the intermediate descriptive format in a central repository and distributing it to a testing appliance to generate stateful and stateless traffic threat signatures without the use of a programming or scripting language.

BRIEF DESCRIPTION OF THE DRAWINGS

Exemplary embodiments and practices of the invention will next be described in a Detailed Description of the Invention, in conjunction with the attached drawing figures, in which.

DETAILED DESCRIPTION OF THE INVENTION

Overview

In the following description, the term "threat signature" will be used to denote specific methodologies employed to break or disable networks and associated equipment. More particularly, a threat signature is a detailed description of the methodologies used to break the system. These descriptions subsume particular hacking techniques, and they can be used, in accordance with the present invention as described below, to generate actual threats to test IDS equipment.

Figure 1:
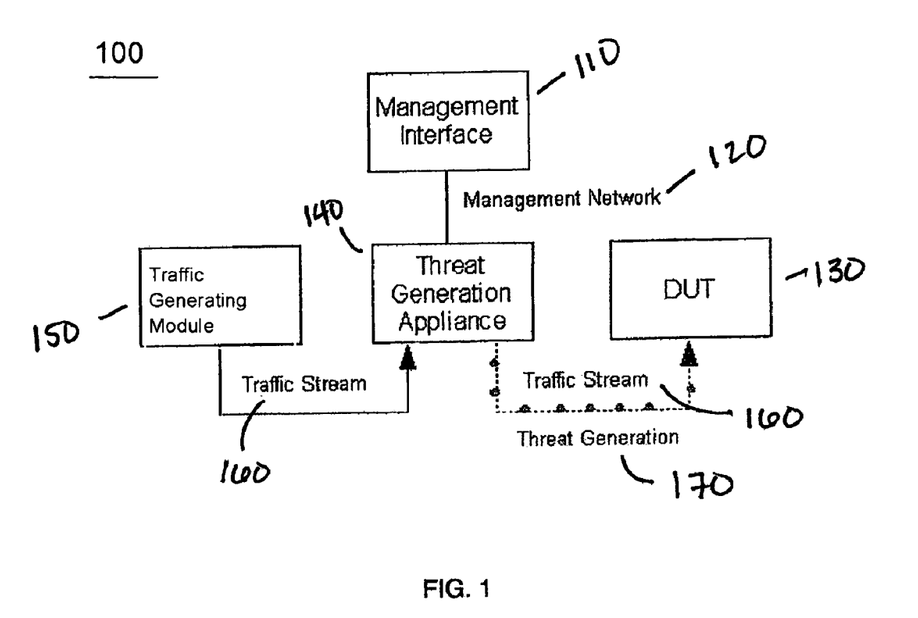
FIG. 1 is a schematic diagram depicting an overview of a network threat testing system in accordance with the invention, adapted for testing networks or network equipment.
Figure 1A:
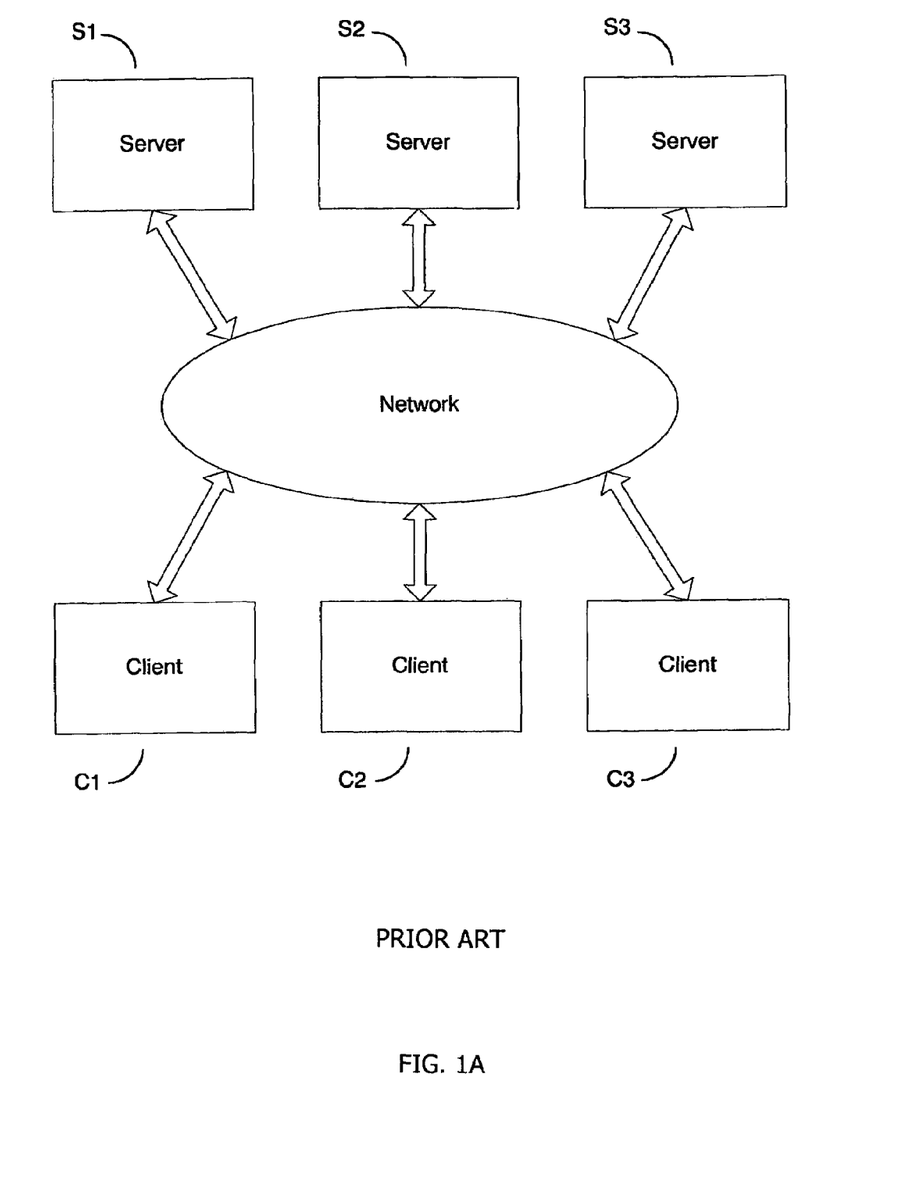
FIG. 1A (Prior Art) is a schematic diagram illustrating data flows between and among digital processors configured and operating as hosts (servers) and clients.

FIG. 1 is a schematic diagram depicting an overview of a network threat testing system 100 in accordance with the invention, adapted for testing networks or network equipment, and using the threat signature concept. As shown therein, the configuration includes a management interface 110, a threat generation appliance 140, a device under test (DUT) 130 (which may be a server or host, or other digital processor or network device or appliance), and a traffic generating module 150. In the illustrated embodiment and practice of the invention, threat signatures are generated on a networked threat generation appliance 140 that has three ports. As shown in FIG. 1, one port communicates with the management network 120 and interface 110, which may be of conventional design and construction. The illustrated configuration thus enables real time design, deployment, and monitoring of the test network without "contaminating" the network under test.

Another port is used to connect the threat generation appliance 140 to the device under test (DUT) 130, while the third port on the threat generation appliance 140 can be used to connect to any device or appliance (which may be of conventional design and construction) that can generate valid network traffic (i.e., traffic that has no threats) 150. In this way, the networked threat generation appliance 140 can generate denial of service attacks, resource exhaustion attacks, threat signatures, or other forms of attacks, and can insert threat signatures into a stream of valid traffic as shown in FIG. 1 and described in greater detail below.

Threat Signature Abstraction: As noted above, conventional approaches to creating and deploying threat signatures through programmatic methods are extremely time consuming. The length of time to replicate a threat and the magnitude of new threats creates windows of vulnerability that represent significant problems to industry. Accordingly, a mechanism is needed that can create a threat signature that does not require coding, but which instead generates a real threat based upon the signature. As will next be described, the present invention provides such a mechanism.

Abstracting threats into signature definitions greatly reduces the above-noted window of vulnerability by reducing the time to replicate and deploy new threats. For purposes of the following discussion, threats are organized into basic types, including denial of services (DOS), resource exhaustion, port scanning, and port corruption. (Other forms of threats can also be addressed in accordance with the invention, using techniques like those next described.)

DOS Attacks: Denial of service (DOS) attacks are stateless transactions that mask the originating port, IP address, and MAC address. These attacks can be generated with a single packet definition and will create unique packet parameters for each packet to disguise the threat. An example of this would be to send an ICMP packet that pings a remote host. By disguising the source IP address, the host repeatedly attempts to reply to a phantom host that does not exist. Generating large amounts of requests will consume completely the resources of the target host. (Resource exhaustion attacks behave and can be generated in an analogous manner.)

In accordance with the invention, a signature threat for this type of attack would resemble the following Table 1, using an XML description format:

TABLE 1

Ping of Death Signature Threat:

```
<SignatureThreat> Ping of Death
    <PacketType> ICMP
        <Addressing>
            <SourceIP> @iprand(10.1.0.1,10000) </SourceIP>
            <DestIP> @input </DestIP>
            <SourceMac> @macrand(10000) </SourceMac>
            <TTL> @irand(2,32) </TTL>
        </Addressing>
        <Data>
            <Packets> 1 </Packets>
            <Size> @irand(1,66666) </Size>
            <Fragments> 1 </Fragments>
            <Value> 0xFF </Value>
        </Data>
        <Header>
            <Type> 9 </Type>
            <Code> 0 </Code>
            <Identifier> 0 </Identifier>
            <Sequence> 0 </Sequence>
```

TABLE 1-continued

Ping of Death Signature Threat:

```
        </Header>
    </PacketType>
</SignatureThreat>
```

Figure 2:
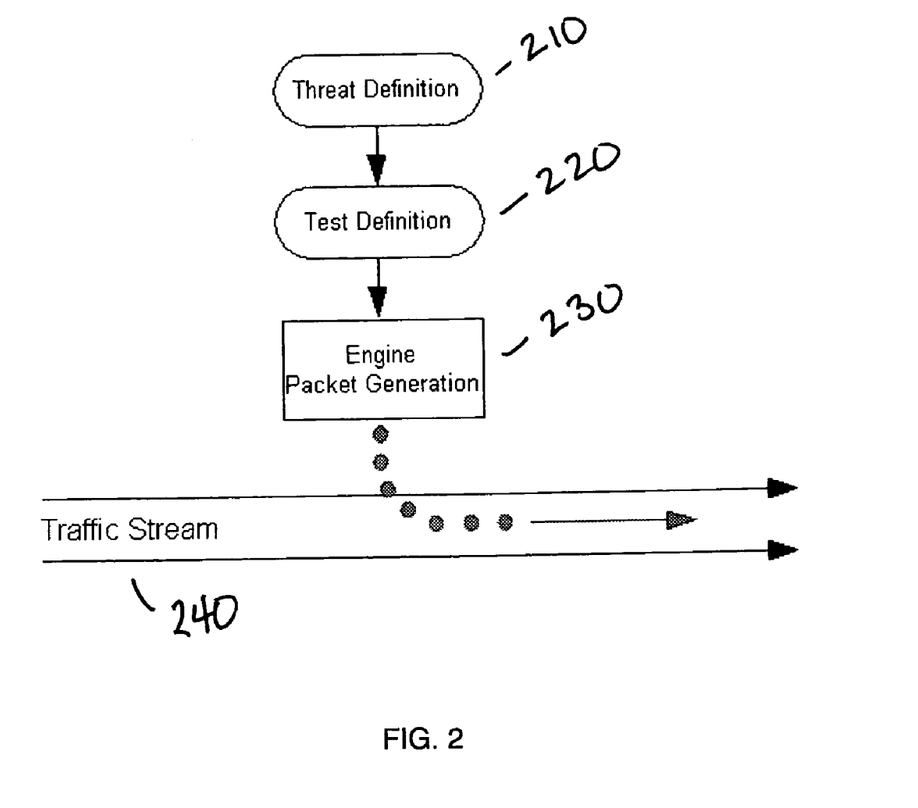
FIG. 2 is a schematic diagram depicting another aspect of the invention, including an engine configured for packet generation.

Stateless traffic can be generated for different packet types (TCP, UDP, IP) using additional test generation engines and additional test parameters. Examples of these parameters would include the following:

1. Test Length
2. Ramp Up Time
3. Peak Time
4. Ramp Down Time
5. Packets per Second FIG. 2 shows an embodiment of the invention utilizing these concepts to place threat-representative traffic (whether DOS, resource exhaustion, or other) into a traffic stream, including a threat definition 210, test definition 220, and packet generation engine 230 for generating packets in accordance with the threat definition and test definition, and for placing the packets into the traffic stream 240 for use in network testing.

Given that the threat definition 210 and test definition 220 can be described in an XML format, these definitions can be further abstracted by using a graphic user interface (GUI) to create them. The GUI can be constructed using known techniques.

Port Scanning: Port scanning can be accomplished using the same methodology. The following XML definition (Table 2) defines a TCP ACK port scan:

TABLE 2

TCP ACK port scan:

```
<SignatureThreat> TCP ACK Port Scan
    <PacketType> TCP
        <Addressing>
            <SouurceIP> @iprand(10.1.0.1,10000)
        </SourceIP>
            <SourcePort> @irand(1,65535) </SourcePort>
            <DestIP> @input </DestIP>
            <DestPort> @next(1,65535)
            <SourceMac> @macrand(10000) </SourceMac>
            <TTL> @irand(2,32) </TTL>
        </Addressing>
        <Data>
            <Packets> 1 </Packets>
            <Size> 0 </Size>
            <Fragments> 1 </Fragments>
            <Value> 0xFF </Value>
        </Data>
        <Header>
            <Sequence> 0 </Sequence>
            <Acknowledgement> @irand(1,65535)
        </Acknowledgement>
            <Window> 0 </Window>
            <Urgent> 0 </Urgent>
        </Header>
        <Flags>
            <URG> 0 </URG>
            <ACK> 1 </ACK>
            <PSH> 0 </PSH>
            <RST> 0 </RST>
            <SYN> 0 </SYN>
            <FIN> 0 </FIN>
        </Flags>
    </PacketType>
</SignatureThreat>
```

Changing the flag bit <FIN> to 1 and setting the <ACK> bit to 0 will result in a FIN port scan. There is an implied looping structure and the transaction will be repeated, as in Table 3:

TABLE 3

```
For each SourceIP
    For each SourcePort
        For each DestIP
            For Each DestPort
                Threat Signature
            Next
        Next
    Next
Next
```

Port Corruption: Port corruption requires a stateful transaction that enables the generation of multiple protocols and packet types. A recent example of this would be the "Buffer Overrun in the RPC interface" in the Microsoft operating system commercially available from Microsoft Corporation, Redmond, Wash.

It is well know that currently there is a vulnerability in the RPC that deals with message exchange over TCP/IP. The failure results because of incorrect handling of malformed messages. This particular vulnerability affects a Distributed Component Object Model (DCOM) interface with RPC, which listens on RPC enabled ports. This interface handles DCOM object activation requests that are sent by client machines to the server. An attacker who successfully exploited this vulnerability would be able to run code with Local System privileges on an infected system. The attacker would be able to take any action on the system, including installing programs; viewing, changing, or deleting data; or creating new accounts with full privileges. (See, e.g., Microsoft Technical Update MS03-026: "Buffer Overrun in RPC May Allow Code Execution.")

A stateful transaction requires some type of persistent connection, to be followed by a sequence of valid or invalid packets. It is a higher level abstraction than packet generators. In accordance with the invention, this can be accomplished through a scripting language that combines higher level networking constructs with specific packet manipulations and packet definitions. These abstractions will enable users to replicate threats without programming.

This would require a higher level abstraction for the TCP connection, and sending one or multiple corrupted packets over the TCP connection, RPC connection, or layer 5-7 protocol connection (HTTP, SMTP, etc.). Packets could be corrupted at any point throughout this phase. Algorithmically, this can be summarized as follows:

1. TCP connection with or without corrupted data;
2. Send corrupted or malformed packets;
3. Disconnect or additional malicious packets sent.

This might at first appear to be a simple exercise. However, to programmatically create a threat using a stateful protocol may take several days. In addition, to replicate each threat signature requires reprogramming every threat. Add to this the time required to (1) research and quantify threats, (2) implement a consistent testing procedure, (3) acquire statistics, and (4) redistribute the threat to all interested parties for testing, and it becomes clear that the entire process could take weeks to implement. In accordance with the present invention, however, the ability to recreate a threat without programming, or to acquire a threat from a threat database, relates to the ability to describe and replicate the threat using a common engine.

The difference between denial of service (DOS) attacks (and analogously, resource exhaustion attacks) and port corruption attacks is that port corruptions are a stateful transaction. They require an exchange of information with a remote sever using a standardized protocol. In contrast, a DOS attack has no state but can initiate activity that implies a state (e.g., sending multiple SYN FIN messages to all ports on a server). In essence, a DOS attack could create step 1 of the above example. Because it has no state, however, steps 2 and 3 are impossible in a DOS attack.

In accordance with the invention, the key to providing an abstracted threat signature that does not require programming is to create a rich XML environment that can represent these complex transactions. This leads to the constructs for creating a three way connection and inserting packets while maintaining connection state (addressing, sequence numbers, time stamps, etc.).

An example of pseudo language for describing this is as set forth in Table 4:

TABLE 4

1. TCPConnect
   1. TCP_SYN using threat signature "XYZ"
   2. TCP_SYNACK
   3. TCP_SYNACKACK using threat signature "ABC"
2. SENDPacket
   1. TCPSend using threat signature "DEF"
   2. TCPSend using threat signature "JKL"
3. TCPTerminate
   1. TCP_FIN In essence, this language describes the "template" for the transaction and the engine provides the state information.

The TCP_SYN shown above in Table 4 is a higher level abstraction that executes the initial TCP connection. The construct "using" is optional, and provides the ability to insert the descriptions defined by that threat signature. For example, it could set a flag bit that is usually set to 0 during the initial connection. It would also be used to set the IP address and port to use for the connection.

The TCPSend sends raw data over the connection. It could optionally have a "using" construct as well. There would be equivalent HTTPSend, FTPSend, SMTPSend, and POP3 Send verbs as well.

The TCP_FIN terminates the connection.

To represent this in an XML format in accordance with the invention would be only slightly different from the previous examples. It simply requires higher level constructs with nested, associated threat signatures be created.

DOS, resource exhaustion, port scans, and port corruption can be implemented in different engines (or alternatively different modules within the same engine) to implement them in a scalable fashion. All of these threats can be inserted into any data stream.

Figure 3:
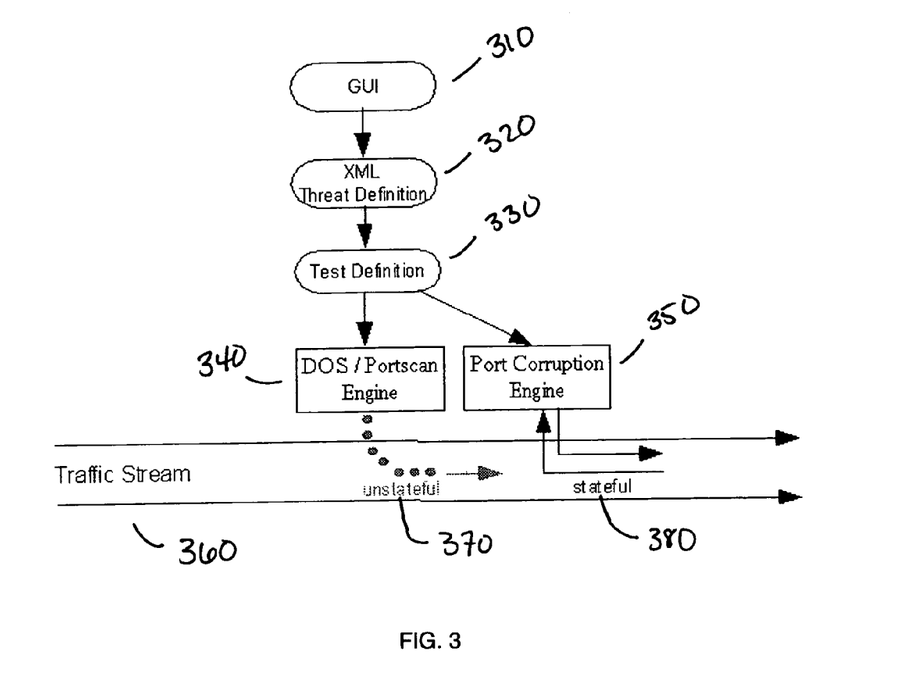
FIG. 3 is a schematic diagram depicting another aspect of the invention, including the use of port scan and port corruption engines for generating stateless (unstateful) and stateful traffic.

FIG. 3 is a schematic diagram depicting an embodiment and practice of the invention with such a configuration, including the use of port scan and port corruption engines for generating stateless (unstateful) and stateful traffic. The configuration shown in FIG. 3 includes a GUI 310, XML Threat Definition layer or module 320, test definition layer or module 330, a DOS/port scan engine 340 that can place stateless traffic 370 into the traffic stream 360, and a port corruption engine 350 that can place stateful traffic 380 into the traffic stream 360.

Figure 4:
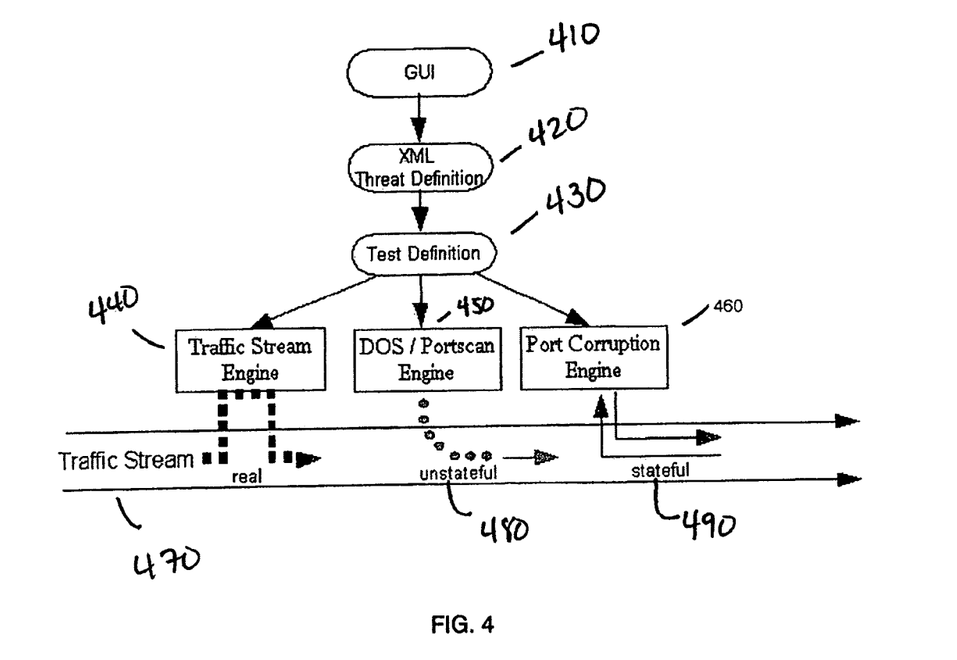
FIG. 4 is a schematic diagram depicting another practice or embodiment of the invention, including aspects of filtering and the provision of traffic stream, port scan and port corruption engines.

Traffic Corruption: The term "traffic corruption" is used herein to denote corrupting an existing traffic scheme. The traffic stream is any data generated external to the corrupting mechanism (see, e.g., FIG. 3). It is advantageous that the means used for generating threat signatures have the ability to modify an existing traffic scheme (as opposed to adding traffic to the stream) to emulate both hacking attacks on existing data and broken or non-performing equipment. The functionality of this environment requires the following operations to be executed in real-time as the data passes through an appliance (see, e.g., FIGS. 3 and 4):

1. Change packet data headers, flags, addressing, and contents.
2. Drop packets
3. Fragment packets
4. Corrupt packets
5. Replay packets
6. Resequence packets Filtering: It will be appreciated that changing all packets on the fly would result in traffic that would be unusable to the most sophisticated device (every packet would be corrupted or resequenced). A smaller percentage needs to be modified to be useful as a testing tool. This requires a filter. A filter, such as that shown schematically in FIG. 4, looks at all data passing through the stream and only modifies a specified portion of it. The filter has rules that enable only certain packets to be corrupted or modified. Filter rules examine the packet contents to make corruption decisions. Any field, header, addressing, or content information can be examined by the filter. Filtering is the inverse of the corruption methods, but uses the same data and constructs. For every filter, there can be a single or multiple actions. By way of example:

Filter:
   Filter all packets with the destination address=10.1.34.234 and the TCP/ACK flag=true and the port=80 and the length>1024

Action:
   Resequence packet and set Header/FIN=true

As shown in FIG. 4, for example, all three negative actions can be implemented simultaneously on the same appliance: packet corruption, port corruption, and stream corruption. These negative actions represent three types of traffic: stateful, stateless, and real streams. In the schematic diagram of FIG. 4, the configuration includes GUI 410, XML threat definition layer 420, test definition layer 430, traffic stream engine 440, DOS/port scan engine 450 and port corruption engine 460.

Figure 5:
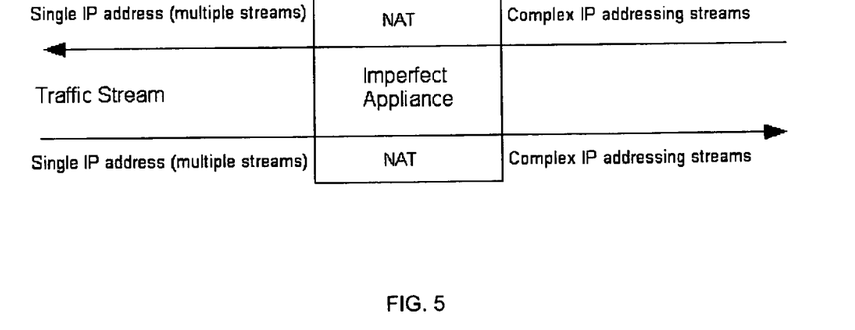
FIG. 5 is a schematic diagram depicting a network address translation (NAT) aspect of the invention.

Variations and Other Implementations: Other implementations of the methods, systems and devices described herein can include modifying a real traffic stream to represent a range of different kinds of Internet traffic. Most traffic generators (stateful or stateless) are limited to simplistic addressing schemes. More complex schemes result in the use of segmented subnets and complicated source routing tables. Since the invention described herein has the ability to change packet information on the fly, it has the basic components to provide NAT capabilities for emulating Internet traffic, in the manner shown in FIG. 5. As shown in FIG. 5, traffic streams (sessions) generated from a single IP address can be transformed by a NAT layer or module in the network testing appliance into multiple source addresses. The converse can also be implemented, as shown in FIG. 5.

Threat Signature Repository: The ability to describe and generate threat signatures without a programming or scripting environment enables these signatures to be stored in an intermediate format. This format comprises a rich descriptive environment that can easily be stored in any database for mass distribution. A network testing engine in accordance with the invention can interpret the threats based upon this descriptive language and generate real threats as if they were programmed by a real hacker. These features enable threats to be defined and distributed quickly, using a simple test file. This enables a system in which a company can host a centralized database of discovered threats and add new threats as they occur, in a timely manner.

CONCLUSION

Those skilled in the art will appreciate that the foregoing detailed description of the invention is set forth by way of example, and that numerous additions, subtractions, and modifications may be made to the structures and sequences of operations described herein, without departing from the spirit and scope of the invention, which is limited solely by the claims appended hereto.

Many other forms of attack, whether similar to or distinct from any of, or a combination of, DOS, resource exhaustion, port scanning, port corruption or other examples described herein, can be generated and handled analogously in accordance with the invention and the techniques, methods and structures described by way of illustration herein.

We claim:

1. A method of testing digital network vulnerability to threats, the method executable in a network of digital processors operable to communicate via a communications channel, the method comprising:
   generating both stateful and stateless network traffic, the stateful and stateless network traffic collectively representing actual threats to the network, wherein the generating is in accordance with one or more stateful or stateless threat signatures, and
   applying the generated stateful and stateless network traffic to the network in a traffic stream, thereby to test network vulnerability to threats,
   wherein stateful and stateless networking traffic is generated and applied to the network to represent actual network threats including any of denial of service, resource exhaustion, port scanning or port corruption, and
   the generating of stateful and stateless networking traffic is effected in accordance with an intermediate descriptive format and without the use of a programming or scripting language.

2. The method of claim 1, wherein the generating of both stateful and stateless networking traffic is operable to define any selected network threat comprising any of denial of service, resource exhaustion, port scanning, or port corruption.

3. The method of claim 2, further comprising using a graphical user interface without the use of a programming or scripting language, and operable to generate an intermediate descriptive format that can in turn be used to generate any of stateful or stateless threat signatures.

4. The method of claim 3 further operable to corrupt any stateful or stateless traffic streams.

5. The method of claim 4, further comprising using a graphic user interface without the use of a programming or scripting language, and that is represented using a descriptive format that requires no programming or scripting language.

6. The method of claim 5, further operable to modify any traffic streams.

7. The method of claim 6, wherein traffic streams are modified using Network Address Translation (NAT) techniques.

8. The method of claim 7, further comprising using a graphical user interface without the use of a programming or scripting language, and that is represented using a descriptive format that requires no programming or scripting language.

9. The method of claim 2 wherein the intermediate descriptive format can be stored in a central repository and distributed to a testing appliance to generate stateful and stateless traffic threat signatures without the use of a programming or scripting language.

10. A system for testing a network of digital processors operable to communicate via a communications channel, the system comprising:
    means for generating both stateful and stateless networking traffic, the stateful and stateless network traffic collectively representing actual threats to the network, wherein the generating is in accordance with one or more stateful or stateless threat signatures, and
    means for applying the generated stateful and stateless network traffic to the network in a traffic stream, thereby to test vulnerability of the network to threats,
    wherein the stateful and stateless networking traffic are generated and applied to the network to represent actual network threats including any of denial of service, resource exhaustion, port scanning or port corruption, and
    the generating of stateful and stateless networking traffic is effected in accordance with an intermediate descriptive format and without the use of a programming or scripting language.

11. The system of claim 10 further comprising a testing appliance operable to generate stateful and stateless traffic threat signatures without the use of a programming or scripting language.

12. A computer software product executable in a computer to test a network of digital processors operable to communicate via communications channel, the network being operable to communicate with the computer, the computer software product comprising computer-executable instructions on a computer-readable medium, the computer-executable instructions comprising:
    first computer-executable instructions executable in the computer to enable the computer to generate both stateful and stateless networking traffic, the stateful and stateless network traffic collectively representing actual threats to the network, wherein the generating is in accordance with one or more stateful or stateless threat signatures, and
    second computer-executable instructions executable in the computer to apply the generated stateful and stateless network traffic to the network in a traffic stream, thereby to test vulnerability of the network to threats,
    wherein the stateful and stateless networking traffic are generated and applied to the network to represent actual network threats including any of denial of service, resource exhaustion port scanning or port corruption, and
    the generating of stateful and stateless networking traffic is effected in accordance with an intermediate descriptive format and without the use of a programming or scripting language.

* * * * *